United States Patent
Weitershaus et al.

(10) Patent No.: US 9,267,077 B2
(45) Date of Patent: Feb. 23, 2016

(54) CHROME-FREE METHODS OF ETCHING ORGANIC POLYMERS WITH MIXED ACID SOLUTIONS

(71) Applicant: Rohm and Haas Electronic Materials LLC, Marlborough, MA (US)

(72) Inventors: Katharina Weitershaus, Kriens (CH); Wan Zhang-Beglinger, Adligenswil (CH); Andreas Scheybal, Zurich (CH); Jonas Guebey, Kriens (CH)

(73) Assignee: Rohm and Haas Electronic Materials LLC

( * ) Notice: Subject to any disclaimer, the term of this patent is extended or adjusted under 35 U.S.C. 154(b) by 85 days.

(21) Appl. No.: 13/863,979

(22) Filed: Apr. 16, 2013

(65) Prior Publication Data

US 2014/0306147 A1 Oct. 16, 2014

(51) Int. Cl.
| | |
|---|---|
| *C09K 13/06* | (2006.01) |
| *C08J 7/12* | (2006.01) |
| *C23C 18/16* | (2006.01) |
| *C23C 18/20* | (2006.01) |
| *C23C 18/24* | (2006.01) |
| *C23C 18/30* | (2006.01) |
| *C25D 3/38* | (2006.01) |

(52) U.S. Cl.
CPC . *C09K 13/06* (2013.01); *C08J 7/12* (2013.01); *C23C 18/1653* (2013.01); *C23C 18/2086* (2013.01); *C23C 18/24* (2013.01); *C23C 18/30* (2013.01); *C25D 3/38* (2013.01)

(58) Field of Classification Search
CPC .......... H05K 3/002; H05K 2203/0796; H05K 1/0346; H05K 3/381; C08J 5/18; C08J 7/12; C08J 7/14; C08L 63/00; H01L 21/31133; C25C 1/10; C25C 7/00; C25B 1/21; C25B 9/06; C25B 11/12; C25B 1/00
See application file for complete search history.

(56) References Cited

U.S. PATENT DOCUMENTS

| | | | | |
|---|---|---|---|---|
| 4,349,421 | A | * | 9/1982 | Khattab ........................ 205/168 |
| 5,143,592 | A | * | 9/1992 | Toro .............................. 205/210 |
| 5,556,787 | A | | 9/1996 | Miller |
| 7,578,947 | B2 | | 8/2009 | Schildmann et al. |
| 8,603,352 | B1 | | 12/2013 | Zhang-Beglinger et al. |
| 2011/0140035 | A1 | | 6/2011 | Schildmann et al. |
| 2013/0186774 | A1 | * | 7/2013 | Pearson et al. ................ 205/674 |
| 2013/0186861 | A1 | | 7/2013 | Pearson et al. |
| 2013/0186862 | A1 | | 7/2013 | Pearson et al. |

FOREIGN PATENT DOCUMENTS

WO 9641160 A1 12/1996

OTHER PUBLICATIONS

Comninellis et al, "Electrochemical oxidation of Mn(II) to $MnO^-_4$ in the presence of Ag(I) Catalyst", Electrochimica Acta, 1991, pp. 1636-1365, vol. 36, No. 8.

(Continued)

*Primary Examiner* — Duy Deo
*Assistant Examiner* — Erin Bergner
(74) *Attorney, Agent, or Firm* — John J. Piskorski (57) ABSTRACT

A chrome-free acidic aqueous solution of sulfuric acid and one or more organic acids and manganese (II) and (III) ions is applied to an organic polymer surface to etch the surface. The etched surface is then plated with metal.

6 Claims, 4 Drawing Sheets

(56) References Cited

OTHER PUBLICATIONS

Pinto, et al, "Electrolytically generated manganese(III) sulphate as a redox titrant: potentiometric determination of thiosemicarbazide, its metal complexes and thiosemicarbazones," Analyst, 1991, pp. 285-289, vol. 116.

Belcher et al, "Trivalent manganese as an oxidimetric reagent", Analytica Chimica Acta, 1952, pp. 322-332, vol. 6.

Comninellis, et al, "Current efficiency losses in indirect electrochemical processing", J. Electrochem. Soc., 1985, pp. 72-76, vol. 132, No. 1.

Cui, et al, "The role of manganese in model systems related to lignin biodegration," Department of Chemistry, University of British Columbia, 2036 Main Mall, Vancouver, BC., Canada.

Domini, et al, "Trivalent manganese as an environmentally friendly oxidizing reagent for microwave- and ultrasound-assisted chemical oxygen demand determination," Ultrasonics Sonochemistry, 2009, pp. 686-691, vol. 16.

Boardman, et al, The catalysis of the anodic oxidation of cobalt(II) and manganese(II) by silver(I) in aqueous sulphuric acid, J. Electroanal. Chem., 1983, pp. 49-56, vol. 149.

Fleischmann et al, "The kinetics of the silver (I)/silver (II) couple at a platinum electrode in perchloric and nitric acids," Journal of Applied Electrochemistry, 1971, pp. 1-7, vol. 1.

Comninellis et al, "Electrochemical production of manganic sulfate in concentrated $H_2SO_4$", J. Electrochem. Soc., 1982, pp. 749-752, vol. 129, No. 4.

Lee, et al, "Electrochemical oxidation of $Mn^{2+}$ on boron-doped diamond electrodes with $Bi^{3+}$ used as an electron transfer mediator", Journal of the Electrochemical Society, 2004, pp. E265-E270, vol. 151, No. 8.

Website http://en.wikipedia.org/wiki/Litre; Litre-Wikipedia downloaded Jun. 24, 2014.

Europe Search Report for corresponding European Application No. 14 16 4701.

Sherigara, et al, "Oxidation of L-Aspartic Acid and L-Glutamic Acid by Manganese (III) Ions in Aqueous Sulphuric Acid, Acetic Acid and Pryophosphate Media: A Kinetic Study", International Journal of Chemical Kinetics, vol. 27, Jan. 1, 1995, pp. 675-690.

Selim, et al, "Coulometric Titration with Higher Oxidation States of Manganese Electrolytic Generation and Stability of +3 Manganese in Sulfuric Acid Media," Anal. Chem. Acta, vol. 21, Jan. 1, 1959, pp. 536-544.

Gernon et al, "Environmental Benefits of Methanesulfonic Acid: Comparative Properties and and Advantages", Green Chemistry, Royal Society of Chemistry, Jun. 1, 1999, pp. 127-140.

Barek, et al, "The Use of Trivalent Manganese Compounds in Titrimetry", CRC Critical Reviews in Analytical Chemistry, vol. 9, May 9, 2008, pp. 55-95.

* cited by examiner

CHROME-FREE METHODS OF ETCHING ORGANIC POLYMERS WITH MIXED ACID SOLUTIONS

FIELD OF THE INVENTION

The present invention is directed to chrome-free methods of etching organic polymers with mixed acid solutions containing manganese ions. More specifically, the present invention is directed to chrome-free methods of etching organic polymers using mixed acid solutions of sulfuric acid and at least one organic acid containing manganese (II) and (III) ions.

BACKGROUND OF THE INVENTION

Prior to metallization a substrate surface containing organic polymers is typically etched to achieve good adhesion between the substrate surface and plated metals. Although great efforts have been made over the years by many chemical suppliers and the plating industry to replace currently used toxic etching solutions no commercial product which is free of hexavalent chromium or Cr(VI) is currently available on the market.

Cr(VI) containing compounds are suspected of being cancer-causing. Accordingly, dealing with these compounds is subject to strict environmental regulations. In the face of the potential danger caused by Cr(VI) releasing compounds, a prohibition of the industrial use of Cr(VI) containing compounds cannot be excluded.

Over the years a variety of chemical species have been suggested in the industry for use as chrome-free oxidizing agents in wet etching processes to modify organic polymer surfaces. Such oxidants include Mn(VII), Mn(VI), Mn(IV), Ce(IV), persulfate, $H_2O_2$, organic solvents such as dioxane, metal halogenides and nitrates of Fe, Cu, Ti, Zn, and Mg. Oxidizing agents are consumed either by the etching process or due to the instability of the oxidants. Therefore frequent replenishing or a re-generation method is needed. Re-generation methods are especially preferred for industrial settings. Mn(VII) is one of the most commonly used oxidizing agents. In solution it is typically in the form of ionic species $MnO_4^-$. Electrochemical regeneration of Mn(VII) in alkaline solutions has been used in different industries, such as in the manufacture of circuit boards. In acidic media re-generation of Mn(VII) appears more difficult than in an alkaline medium. Published literature using catalysts such as Ag(I) or Bi(III) for electrochemical oxidation is sparse. The studies of Fleischmann et al. (J. Appl. Electrochem. Vol. 1, pp. 1, 1971) have shown that Ag(I) is a good catalyst for oxidizing both organic and inorganic species electrochemically. Park et al. (J. Electrochem. Soc. Vol. 151, pp. E265, 2004) disclose that Bi(III) on a boron-doped diamond (BDD) electrode also may act as electron transfer mediator to oxidize Mn(II) to Mn(VII). Boardman (J. Electroanal. Chem. Vol. 149, pp. 49, 1983) and Comninellis (Electrochimica Acta, Vol. 36, No. 8, pp. 1363, 1991) have demonstrated the possibility of electrochemical formation of Mn(VII) from Mn(II) in a sulfuric acid medium in the presence of Ag(I) and the experimental conditions to increase the current efficiency of Mn(VII) formation. US2011/0140035 discloses similar methods for use in a permanganate acidic pickling solution for pre-treatment of plastic surfaces.

However, either in an acidic or alkaline medium, Mn(VII) is unstable and tends to reduce to its lower oxidation states, especially to Mn(IV), consequently forming a large quantity of the insoluble $MnO_2$ and causing quality issues on the treated polymer surfaces. Frequent removal of $MnO_2$ precipitation from the permanganate etching solution is therefore required in the industrial scale operation. Therefore, there is a need for a method which does not form substantial amounts of undesirable insoluble reaction products and the oxidizing agent can be re-generated during continuous operation.

SUMMARY OF THE INVENTION

Methods include providing a substrate including one or more organic polymers; providing an aqueous acid solution consisting essentially of sulfuric acid, one or more organic acids and Mn(II) ions and Mn(III) ions; and contacting the substrate including the one or more organic polymers with the aqueous acid solution to etch the one or more polymers of the substrate.

Aqueous acid solutions consist essentially of sulfuric acid and one or more organic acids and Mn(II) ions and Mn(III) ions.

The methods and aqueous acid solutions etch the one or more polymers of substrates prior to metallization using the chrome-free aqueous acid solutions, thus eliminating a hazardous and an environmentally undesirable compound. The methods and aqueous acid solutions use dissolved Mn(III) ions as etching agents in place of Cr(VI) to roughen the one or more polymers. Mn(III) ions are more stable in the aqueous acid solution than Mn(VII) ionic species, do not readily form insoluble $MnO_2$ as does Mn(VII), and Mn(III) ions reduced to Mn(II) ions in the etching process may be readily regenerated. The mixture of the sulfuric acid and the one or more organic acids increases the solubility of the sources of the Mn(II) and Mn(III) ions such that the one or more sources of the Mn(II) and Mn(III) ions are substantially completely dissolved in the aqueous acid solution to provide sufficient concentrations of the Mn(III) oxidizing agent in the solution and to operate using standard solution circulation and filtration systems under production conditions. Furthermore, it is known that solutions with higher sulfuric acid content readily adsorb water from the atmosphere due to the hygroscopicity of sulfuric acid. By replacing part of the sulfuric acid with one or more organic acids, water adsorption can be reduced or prevented thus maintaining good etching performance.

DETAILED DESCRIPTION OF THE INVENTION

As used throughout this specification, the abbreviations given below have the following meanings, unless the context clearly indicates otherwise: ° C.=degrees Centigrade; g=gram; L=liter; M=molar or moles/liter; mM=millimolar; mol=moles; mmol=millimoles; mL=milliliters; g/L=grams per liter; m=meters; A=amperes; mA=milliamperes; dm=decimeter; UV=ultra-violet; nm=nanometers; cm=centimeter; wt %=percent by weight; $T_g$=glass transition temperature; ASTM=American Standard Testing Method; Mn=elemental manganese; Mn(II)=manganese two oxidation state; Mn(III)=manganese three oxidation state; Mn(IV)=manganese four oxidation state; Mn(VI)=manganese six oxidation state; Mn(VII)=manganese seven oxidation state; Cr(VI)=chromium six oxidation state; Ag=silver; Bi=bismuth; Ce=cerium; Pb=lead; Ir=iridium; $H_2SO_4$=sulfuric acid; $MnO_4^-$=permanganate; $KMnO_4$=potassium permanganate; $Ag_2SO_4$=silver sulfate; $Ag_2O$=silver oxide; $O_3$=ozone; $H_2O_2$=hydrogen peroxide; MSA=methanesulfonic acid; SEM=scanning electron microscope; mbar=millibar; absorbance is $-\log(I/I0)$, where I0=incoming light intensity, I=transmitted light intensity; and FE-SEM=high resolution field emission scanning electron microscope.

The term "stoichiometric" means a quantitative relationship, typically expressed as a ratio between two or more chemical substances undergoing a physical or chemical change; the point at which the chemical reaction ends or stabilizes. All numerical ranges are inclusive and combinable in any order, except where it is logical that such numerical ranges are construed to add up to 100%. All amounts are percent by weight and all ratios are by weight, unless otherwise noted. The terms "a" and "an" are understood to include both the singular and the plural.

Solutions consist essentially of Mn(II) ions and Mn(III) ions, sulfuric acid and one or more organic acids. In the solutions the active etching agent for etching and roughening one or more polymers is the dissolved Mn(III) ions. The maximum concentrations of the Mn(II) and Mn(III) ions in solution are limited by their solubility at a given acid concentration and temperature. Minor experimentation may be done to determine the saturation concentration for a given component of the solution. One or more sources of Mn(II) and Mn(III) ions may be included in the solutions up to just below their saturation concentrations. The aqueous acid solutions are not suspensions, dispersions or colloidal solutions. All of the solutes of the aqueous acid solutions are substantially dissolved in the solvent. The solutions are chromium-free. Sufficient water is added to bring the solution to 100 wt %. The amount of water added may be up to 45 wt % of the solution, preferably up to 25 wt %. If the concentration of the water is too high, the etching performance of the solution and the stability of the Mn(III) ions in solution is compromised.

The presence of Mn(II) ions enables Mn(III) ions to be substantially the only Mn species in a higher oxidation state than Mn(II). In an acidic medium, if other Mn species having higher oxidation states than Mn(III) form in the solution, they are reduced to Mn(III) by the following redox reactions:

Mn(VII)+4Mn(II)→5Mn(III)     eq.1

Mn(VI)+3Mn(II)→4Mn(III)     eq.2

Mn(IV)+Mn(II)→2Mn(III)     eq.3

The pH of the etching compositions are from less than 1 to 6, preferably from less than 1 to 3, more preferably less than 1. In the presence of Mn(II) ions, the solutions are substantially free of Mn(VI), Mn(VII) and the insoluble $MnO_2$.

Preferably, Mn(II) ions are at concentrations of 0.1 mmol/L to just prior to precipitation or crystallization of Mn(II) salts, more preferably the Mn(II) ions are at concentrations of 1 mmol/L to just prior to precipitation of Mn(II) salts. Most preferably the Mn(II) ions are at concentrations of 1 mmol/L to 50 mmol/L. The maximum concentration of the Mn(II) ions in solution may vary depending on the temperature and acid content of the composition; however, this may be readily determined by visual inspection of the solution followed by measuring the total Mn concentration with atomic absorption spectroscopy (AAS). The Mn(II) ion concentration in solution is then determined by the difference between the total Mn concentration in solution and the Mn(III) ion concentration in solution determined by UV-VIS analysis at the wavelength from 530 nm to 520 nm UV-VIS and AAS are well known in the art and are the most commonly used analytical methods for the analysis of metal concentrations in solutions.

Preferably, Mn(III) ions are at concentrations of 0.01 mmol/L to just prior to precipitation of Mn(III) salts, more preferably the Mn(III) ions are at concentrations of 1 mmol/L to just prior to precipitation of Mn(III) salts. Most preferably the Mn(III) ions are at concentrations from 1 mmol/L to 70 mmol/L. The maximum concentration of the Mn(III) ions in solution may vary depending on the temperature and acid content of the composition; however, this may be readily determined by visual inspection of the solution followed by measuring the Mn(III) ion concentration using UV-VIS analysis as mentioned above.

Sources of Mn(III) ions in the solutions, include, but are not limited to Mn(III)-sulfate, Mn(III)-acetate, Mn(III)-acetylacetonate, Mn(III)-fluoride, Mn(III)-methanesulfonate, Mn(III)-oxide, Mn(III)-oxyhydroxide, Mn(III)-phosphate, Manganese(III) species with nitrogen-chelates such as porphines such as 5,10,15,20-tetraphenyl-21H,23H-porphine and 2,3,7,8,12,13,17,18-octaethyl-21H-23H-porphine and phthalocyanines. Such compounds are known in the art and literature and some are commercially available. They are included in the solutions in amounts to provide the desired concentrations of Mn(III) ions in the solutions.

Sources of Mn(II) ions include, but are not limited to Mn(II)-sulfate, Mn(II)-phosphate, Mn(II)-hydrogen phosphate, Mn(II)-hypophosphate, Mn(II)-carbonate, Mn(II)-oxide, Mn(II)-hydroxide, Mn(II)-halogenide, Mn(II)-nitrate, Mn(II)-acetate, Mn(II)-lactate, Mn(II)-oxalate, Mn(II)-citrate, Mn(II)-acetylacetonate, Mn(II)-sulfide, Mn(II)-formate, Mn(II)-ethylenediamine tetraacetate-complexes (EDTA), Mn(II)-nitrilo triacetic acid (NTA) complexes, manganese(II) species with nitrogen-chelates such as porphines such as 5,10,15,20-tetraphenyl-21H,23H-porphine and 2,3,7,8,12,13,17,18-octaethyl-21H-23H-porphine and phthalocyanines. Such manganese compounds are known in the art and are known in the literature and some are commercially available. They are included in the solutions in sufficient amounts to provide the desired Mn(II) ion concentrations in the solutions.

Mn(III) species may also be provided in the etching solutions chemically by using one or more Mn(II) compounds and one or more oxidizing agents. Oxidizing agents include, but are not limited to $KMnO_4$, $MnO_2$, persulfates, such as alkali metal persulfates including ammonium and OXONE®, hydrogen peroxide or other inorganic peroxides, such as alkali, alkaline earth metal peroxides, organic peroxides, such as peroxycarbonic acids or hydroperoxides, chlorites such as alkali and alkaline earth metal chlorites, silver chlorite or lead chlorite, chlorates such as alkali and alkaline earth metal chlorates, perchlorates such as alkali and alkaline earth metal perchlorates including ammonium perchlorate, tetrabutylammonium perchlorate, silver perchlorate, copper perchlorate, nickel perchlorate, zinc perchlorate, cadmium perchlorate, lead perchlorate, mercury perchlorate or iron perchlorate and hypochlorites such as alkali and alkaline earth metal hypochlorites, osmiumtetroxide, silver(II)-oxide, ozone, cerium(IV) such as ammonium cerium(IV)-nitrate, cerium (IV)-oxide, cerium(IV)-sulfate, cerium(IV)-fluoride or ammonium cerium(IV)-sulfate dihydrate, and lead acetate. The amount of oxidizing agent or mixtures thereof added to the solutions are added in amounts below the stoichiometric amount of the Mn(II) compounds, such that the amount of the Mn(III) ions generated is 0.01 mmol/L to a concentration just prior to precipitation of Mn(II) salts, preferably the Mn(II) ion concentration is 0.1 mmol/L to just prior to precipitation after the oxidizing agents have substantially all reacted. Most preferably oxidizing agents are included in the solutions such that the Mn(II) ion concentration ranges from 1 mmol/L to 50 mmol/L.

Mn(III) ions may also be generated from Mn(II) ions by electrolysis. One or more Mn(II) compounds are added to an acidic aqueous solution including sulfuric acid one or more organic acids. The electrolysis may be conducted in a one compartment cell or in a two compartment cell where anolyte and catholyte are separated by using a membrane or porous ceramic tube or plate. The anolyte includes Mn(II) ions, sulfuric acid and one or more organic acids and the catholyte includes sulfuric acid and one or more organic acids. Anodes and cathodes of various materials may be used, such as, but not limited to boron doped diamond (BDD), graphite, platinum, platinized titanium, platinized niobium, lead, lead alloys, $PbO_2$, $IrO_2$ or mixed oxide anodes. Electrolysis is performed until a desired amount of Mn(III) ions are produced to etch an organic polymer in preparation for subsequent metallization. Current densities may vary depending on the electrode materials and the rate of Mn(III) ion generation. Typically the current density is 0.1 $A/dm^2$ to 100 $A/dm^2$. When the Mn(III) ions fall below the desired amount, electrolysis is started again until the desired amount of Mn(III) ions in the etch solution is reached. Electrolysis reduces or eliminates the problem of having to replenish the etch solutions during operation, such as in an industrial setting where time, efficiency and cost are important parameters to a given industry. Also installation costs for apparatus used in the electrolysis method are reduced. Combinations of the use of one or more oxidizing agents, electrolysis and one or more sources of Mn(II) and Mn(III) salts also may be used to achieve the desired Mn(II)/Mn(III) ion concentrations.

Optionally one or more catalysts may be added to the solutions when applying the electrolysis method. One or more catalysts at concentrations from 0.01 mmol/L to 1 mmol/L may be used to increase the anodic current efficiency of the Mn(II)/Mn(III) oxidation reaction and increase the etching activity of the composition. Such catalysts include, but are not limited to, Ag(I), Bi(III), Ce(III) and Pb(II) ions. Sources of such catalytic ions are known in the art and literature and many are commercially available.

Inorganic acid in the etching solutions is preferably limited to sulfuric acid. Preferably, salts of inorganic acids including salts of sulfuric acid are excluded from the solutions. Sulfuric acid is included in the aqueous acid solutions in amounts of 1 wt % to 89 wt %, preferably from 15 wt % to 70 wt %. Organic acids include, but are not limited to alkane sulfonic acids, such as methane sulfonic acid, ethane sulfonic acid and propane sulfonic acid, aryl sulfonic acids, such as phenyl sulfonic acid and naphthyl sulfonic acids, carboxylic acids such as acetic acid, lactic acid, citric acid, formic acid and ascorbic acid. Preferably, the organic acids are alkane sulfonic acids and aryl sulfonic acids. More preferably the organic acids are alkane sulfonic acids. Most preferably, the organic acids are ethane sulfonic acid and methane sulfonic acid. Organic acids are included in the aqueous acid solutions in amounts of 1 wt % to 89 wt %, preferably, 15 wt % to 70 wt %. Preferably, the concentration of sulfuric acid and the organic acid are not the same in solution. Preferably the concentration of one is higher than the other to prevent the water content from changing. Salts of organic acids are preferably excluded from the aqueous acid solutions.

The substrate with the one or more organic polymers is immersed in the aqueous acid solution or the solution is sprayed on the substrate. Etching of the organic polymer is done at solution temperatures of 10° C. to 135° C., preferably from 20° C. to 100° C., more preferably from 30° C. to 80° C.

Organic polymers include, but are not limited to thermosetting resins, thermoplastic resins, low $T_g$ resins, high $T_g$ resins and combinations thereof. Thermoplastic resins include, but are not limited to, acetal resins, acrylics, such as methyl acrylate, cellulosic resins, such as ethyl acetate, cellulose propionate, cellulose acetate butyrate and cellulose nitrate, polyethers, nylon, polyethylene, polypropylene, polystyrene, styrene blends, such as acrylonitrile styrene and copolymers and acrylonitrile-butadiene styrene (ABS) copolymers, polycarbonates (PC), polychlorotrifluoroethylene, and vinylpolymers and copolymers, such as vinyl acetate, vinyl alcohol, vinyl butyral, vinyl chloride, vinyl chloride-acetate copolymer, vinylidene chloride and vinyl formal.

Thermosetting resins include, but are not limited to, allyl phthalate, furane, melamine-formaldehyde, phenol-formaldehyde and phenol-furfural copolymers, alone or compounded with butadiene acrylonitrile copolymers or acrylonitrile-butadiene-styrene (ABS) copolymers, polyacrylic esters, silicones, urea formaldehydes, epoxy resins, allyl resins, glyceryl phthalates and polyesters.

The solutions may also be used to etch both low and high $T_g$ resins. Low $T_g$ resins have a $T_g$ below 160° C. and high $T_g$ resins have a $T_g$ of 160° C. and above. Typically high $T_g$ resins have a $T_g$ of 160° C. to 280° C. High $T_g$ polymer resins include, but are not limited to, polytetrafluoroethylene (PTFE) and polytetrafluoroethylene blends. Such blends include, for example, PTFE with polyphenylene oxides and cyanate esters. Other classes of polymer resins which include resins with a high $T_g$ include, but are not limited to, epoxy resins, such as difunctional and multifunctional epoxy resins, bimaleimide/triazine and epoxy resins (BT epoxy), epoxy/polyphenylene oxide resins, acrylonitrile butadienestyrene (ABS), polycarbonates (PC), polyphenylene oxides (PPO), polypheneylene ethers (PPE), polyphenylene sulfides (PPS), polysulfones (PSU), polyamides (PA), polyesters such as polyethyleneterephthalate (PET) and polybutyleneterephthalate (PBT), polyetherketones (PEEK), liquid crystal polymers (LCP), polyurethanes (PU), polyetherimides (PEI), epoxies and composites thereof.

The substrate with the organic polymer is treated with the solution for 10 seconds to 30 minutes, preferably 2 minutes to 15 minutes. After the organic polymers of the substrate are etched the substrate is rinsed with water and then further processed using conventional methods in preparation for metallization. It is then metalized using conventional metal plating processes and metal plating baths, such as electroless nickel and electroless copper.

The following examples are included to further illustrate the invention but are not intended to limit its scope.

EXAMPLE 1

Comparative

Four different $H_2SO_4$/MSA mixtures containing 20 wt % $H_2O$ but with different amounts of $H_2SO_4$ and MSA were prepared by mixing $H_2O$, 18 M $H_2SO_4$, and 9.8 M MSA to yield 1.8 liters of aqueous acid mixtures shown in the table below:

TABLE 1

| $H_2SO_4$ (wt %) | MSA (wt %) | $H_2O$ (wt %) | 18M $H_2SO_4$ (mL) | 9.8M MSA (mL) | $H_2O$ (mL) |
|---|---|---|---|---|---|
| 80 | 0 | 20 | 1317 | 0 | 483 |
| 60 | 20 | 20 | 956 | 594 | 251 |
| 50 | 30 | 20 | 784 | 877 | 140 |
| 40 | 40 | 20 | 617 | 1150 | 32 |

Figure 1:
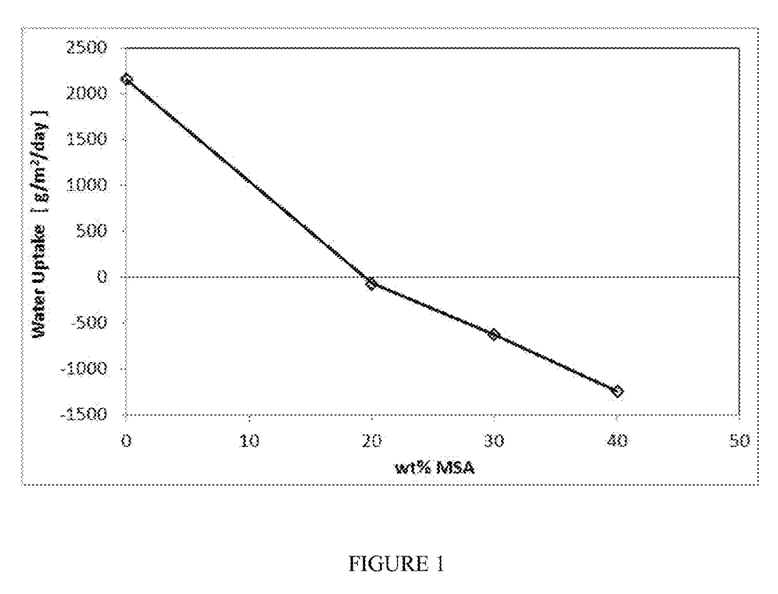
FIG. 1 is a graph of water uptake $g/m^2$/day at 65° C. vs. wt % methanesulfonic acid in mixtures of 20 wt % $H_2O$ and varying $H_2SO_4$ content.

The mixtures were gently stirred at 65° C. for 24 hours in 2 liter beakers open to the ambient environment (23° C., 20% relative humidity) and the weight gain due to hygroscopicity of the acid mixtures in each solution was determined by measuring the difference of the solution weight before and after a 24 hour period. Since the vapor pressures of MSA and $H_2SO_4$ were much lower than the water vapor pressure (MSA 0.07 mbar, $H_2SO_4$ 0.005 mbar, $H_2O$ 250 mbar at 65° C.), the weight change of the solution was primarily caused by adsorption of water from the atmosphere or by water evaporation from the etching solution. FIG. 1 shows the measured water uptake for the different mixtures as a function of MSA content. Positive values indicated a weight increase, i.e. hygroscopic water uptake, while negative values indicated a weight loss, i.e. water evaporation. The mixture which did not include any MSA had an increase in water uptake of around 2100 g/m²/day. In contrast, the mixtures which included MSA had negative water uptake values of from just below 0 g/m²/day to around −1300 g/m²/day. The data clearly showed that by replacing part of the $H_2SO_4$ with 20 wt % to 40 wt % of MSA the water uptake or the hygroscopicity of the mixtures decreased.

EXAMPLE 2

Comparative

A stock solution of Mn(III) ions was prepared by dissolving 4.97 g $MnSO_4.H_2O$ (29.6 mmol) to 120 mL of water. 585 mL of 9.6 M $H_2SO_4$ was added to yield 700 mL of a solution containing 29.6 mmol Mn(II) ions in 8 M $H_2SO_4$ (Solution A). 1.162 g (7.3 mmol) $KMnO_4$ was dissolved in 35 mL of water to form an aqueous solution (Solution B). Solution B was added dropwise to solution A under stirring. Stirring was continued for another 2 hours at room temperature. During this time the $MnSO_4$ reacted according to equation 1 with $KMnO_4$ yielding a blood red solution of 50 mM Mn(III) ions in 7.6 M sulfuric acid.

Figure 2:
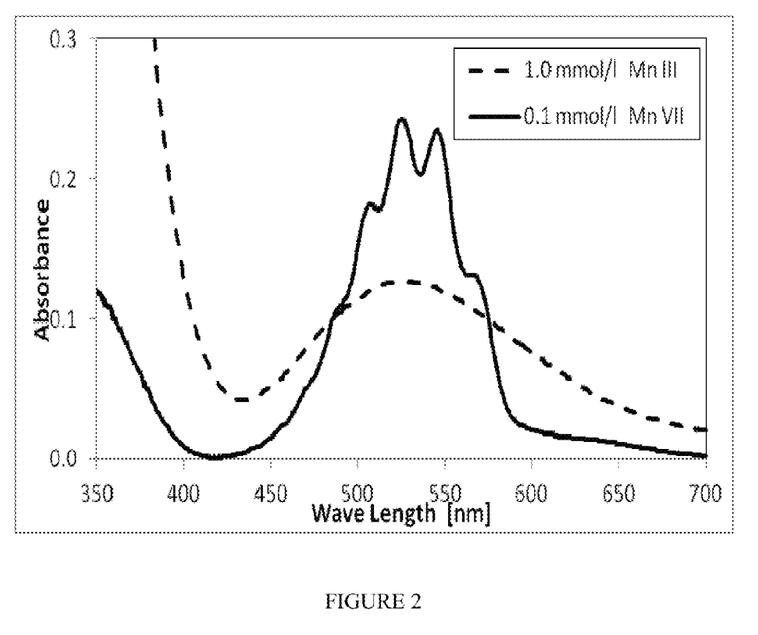
FIG. 2 is a UV-VIS spectrum of absorbance vs. wave length in nm of a 1 mmol/L Mn(III) ions solution and a 0.1 mmol/L $KMnO_4$ solution.

An aliquot of 2 mL of Mn(III) ion stock solution and 35.3 mL of concentrated sulfuric acid (18M) was introduced in a 100 mL volumetric flask and topped with 14M sulfuric acid to make a 1 mmol/L solution of Mn(III) ions. The pH of the solution was less than 1. A 10 mL aliquot was taken from the 1 mM Mn(III) solution and placed in a quartz cuvette. The cuvette was then placed in a dual beam UV-VIS spectrometer (Hitachi U-2010 spectrometer) to measure its absorbance. The UV absorbance was scanned between 700 nm to 350 nm and the absorbance was measured from 520 nm to 525 nm. The absorbance spectrum of a 1 mM Mn(III) ion solution is shown in FIG. 2 by the dotted line.

An aqueous stock solution of 10 mmol (1.58 g) $KMnO_4$ was prepared by dissolving powdered $KMnO_4$ in one liter of de-ionized water to make a 10 mmol/L solution of Mn(VII) ions. A 10 mL aliquot was introduced into a 1 liter volumetric flask and topped with de-ionized water to make a 0.1 mmol/L solution of Mn(VII) ions. 10 mL of the 0.1 mmol/L solution was placed in a quartz cuvette and then placed in the UV-VIS spectrometer to measure its absorbance. The UV absorbance was scanned from 350 nm to 700 nm and the absorbance was measured from 450 nm to 600 nm. The solid line in FIG. 2 shows the absorbance spectrum of 0.1 mmol/L Mn(VII) ions. Although the peak maxima for each manganese species was within the same spectral range of 450 nm to 600 nm, the characteristic vibrational substructure of $MnO_4^-$ ion and the strong absorbance of Mn(III) ions at wavelengths of below 400 nm allowed for the two species to be distinguished.

EXAMPLE 3

Figure 3:
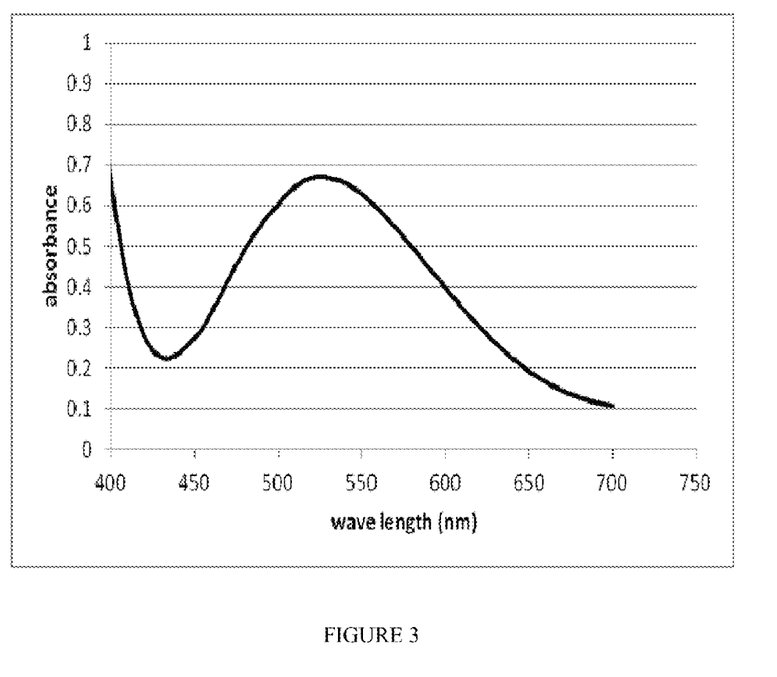
FIG. 3 is a UV-VIS spectrum of absorbance vs. wave length in nm of a ten times diluted aqueous acid etch solution containing 49.4 mmol Mn(III) ions.

An anode made of platinized titanium was placed in a colorless solution of 10.14 g (60 mmol) $MnSO_4.H_2O$ and 0.36 g (1.15 mmol) $Ag_2SO_4$ in a mixed acid solution containing 18 mL $H_2O$, 639 mL of 9.8 M methansulfonic acid and 343 mL of 18 M sulfuric acid at 65° C. to provide an aqueous acid solution of 39.72 wt % sulfuric acid, 39.72 wt % methanesulfonic acid and 19.93 wt % water and 0.6 wt % $MnSO_4$. A cathode made of platinum wire was placed in a separate compartment containing 14 M sulfuric acid. To separate anolyte and catholyte a porous ceramic tube was used allowing current to pass between the compartments. The electrodes were connected to a conventional rectifier to provide a current source. When an anodic current density of 8 A/dm² was applied, the solution turned from colorless to dark blue-violet indicating that Mn(III) ions were being generated. The current was switched off after the Mn(III) ion concentration reached 49.4 mM. There was no indication that Mn(III) or Mn(II) ions began to precipitate out of the solution as insoluble salts. UV-VIS analysis of the 10× diluted solution with 14 M sulfuric acid showed a single absorbance peak within the range of 525-535 nm with a peak maximum at 531 nm as shown in FIG. 3. This revealed that no Mn(VII) species was formed in the electrolyte. FIG. 3 may be contrasted with FIG. 2 where the solid line indicated the presence of Mn(VII) ions.

An injection molded coupon of ABS/PC polymer known as BAYBLEND™ T45PG polymer blend (available from Bayer) was immersed into the above solution for 10 minutes at 65° C. to etch the surface of the coupon. The pH of the solution was less than 1 as measured using a conventional pH meter. The etched coupon was subsequently rinsed with de-ionized water and then immersed in CONDUCTRON™ DP-H activator colloidal palladium solution (available from Dow Advanced Materials, Marlborough, Mass.) for 3 minutes at 30° C. The coupon was then rinsed with de-ionized water and immersed in a solution of ACCELERATOR™ PM-964 solution (available from Dow Advanced Materials) for 5 minutes at 45° C. After rinsing with de-ionized water the coupon was then immersed in NIPOSIT™ PM-980 Electroless Nickel plating bath (available from Dow Advanced Materials) for 10 minutes at 30° C. to form a conductive metal layer on the coupon. The nickel plated coupon was rinsed and subsequently plated with a copper layer from a conventional copper pyrophosphate electroplating bath containing 110 g/L copper pyrophosphate, 400 g/L potassium pyrophosphate, 10 g/L citric acid and 3 g/L ammonium ions at pH 8.5 for 6 minutes at 40° C. with a current density of 1 A/dm². The additional thin copper layer increased conductivity of the electroless nickel layer to facilitate the copper electroplating with higher current densities in the next step. Another layer of copper was electroplated on the copper pyrophosphate layer using COPPER GLEAM™ DL 900 Copper Electroplating bath (available from Dow Advanced Materials). Copper electroplating was done at a current density of 5 A/dm² for 50 minutes. The coupon showed complete coverage of the nickel. Adhesion of the metal layers to the ABS/PC coupon was tested using the ASTM D3359 cross-hatch and tape test method. Good adhesion between ABS/PC and the metal layers was observed. There was no indication of any metal on the tape after it was pulled from the coupon.

EXAMPLE 4

7 g $MnSO_4 \cdot H_2O$ (42 mmol) was dissolved in 200 mL of water. To this solution 162 mL of 9.8 M methanesulfonic acid and 564 mL 18 M $H_2SO_4$ were added slowly due to the exothermic nature of the reaction. Afterwards a solution of 1.26 g $KMnO_4$ (8 mmol) in 75 mL water was added under vigorous agitation. The 8 mmol $KMnO_4$ reacted with 32 mmol $MnSO_4$ as follows:

to yield 40 mmol Mn(III) ions and 10 mM Mn(II) ions in a mixed acid solution with 64.53 wt % $H_2SO_4$, 9.93 wt % methanesulfonic acid and 24.88 wt % $H_2O$. The solution had a dark blue-violet color and its UV-VIS spectrum was substantially the same as shown in FIG. 3 with a single peak and a peak maximum at 530 nm. This provided substantial evidence that Mn(III) was the only Mn species with an oxidation state higher than +2.

Figure 4:
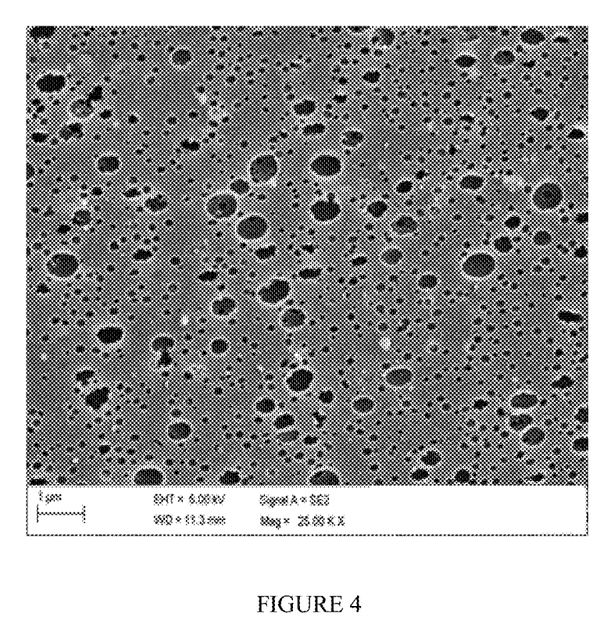
FIG. 4 is an SEM image at 25,000× magnification revealing a roughened surface suitable for metallization.

An injection molded coupon of NOVODUR™ P2MC ABS polymer available from Styrolution Group Corporation was immersed for 10 minutes at 65° C. into the acid solution and rinsed with de-ionized water afterwards. After drying the coupon at room temperature it was sputtered with a thin gold layer using a Balzers Union SCD 040, a gold source and 15 mA current for 2 minutes to obtain a conductive surface suitable for obtaining SEM images. The SEM image taken with a sigma VP FE-SEM from Zeiss at 25,000× magnification as shown in FIG. 4 revealed that the acid solution provided a roughened surface suitable for metallization.

EXAMPLE 5

An injection molded coupon of NOVODUR™ P2MC ABS polymer was immersed into the aqueous acid solution of Example 4 for 10 minutes at 65° C. to etch the surface of the coupon. The etched coupon was then rinsed with de-ionized water and then plated by the process described in Example 3. Adhesion of the metal layers to the ABS coupon was tested using the ASTM D3359 cross-hatch and tape test. Good coverage and good adhesion between ABS and the metal layers were observed. There was no metal observed on the tape after pulling it from the metal layers on the coupon.

What is claimed is:

1. A method comprising:
   a. providing a substrate comprising one or more organic polymers;
   b. providing an aqueous acid solution consisting essentially of sulfuric acid, one or more organic acids selected from the group consisting of alkane sulfonic acids and aryl sulfonic acids, one or more sources of Mn(II) ions and Mn(II) ions and Mn(III) ions and one or more oxidizing agents selected from the group consisting of $KMnO_4$, persulfates, ammonium, inorganic peroxides, organic peroxides, chlorites, chlorates, perchlorates, hypochlorites, osmiumtetroxide, silver(II)-oxide, ozone, cerium(IV) and lead acetate wherein the oxidizing agents are in amounts to provide 1 mmol/L to 50 mmol/L of the Mn(II) ions; and
   c. contacting the one or more organic polymers of the substrate with the aqueous acid solution to etch the one or more organic polymers of the substrate.

2. The method of claim 1, wherein the Mn(III) ions are at a concentration of 1 mmol/L to 70 mmol/L.

3. The method of claim 1, wherein the sulfuric acid is at a concentration of 1 wt % to 89 wt %.

4. The method of claim 1, wherein the organic acid is at a concentration of 1 wt % to 89 wt %.

5. The method of claim 1, wherein the alkane sulfonic acids are chosen from methane sulfonic acid, ethane sulfonic acid and propane sulfonic acid.

6. The method of claim 1, wherein the aryl sulfonic acids are chosen from phenyl sulfonic acid and naphthyl sulfonic acid.

* * * * *